United States Patent
Park

(10) Patent No.: US 10,168,161 B2
(45) Date of Patent: Jan. 1, 2019

(54) CHANGING A POSITION DETERMINATION SCHEME USED BY A USER EQUIPMENT DURING A TRANSITION BETWEEN INDOOR AND OUTDOOR SPACES RELATIVE TO AN ENCLOSED ENVIRONMENT

(71) Applicant: QUALCOMM Incorporated, San Diego, CA (US)

(72) Inventor: Young Shin Park, Stanford, CA (US)

(73) Assignee: Qualcomm Incorporated, San Diego, CA (US)

( * ) Notice: Subject to any disclaimer, the term of this patent is extended or adjusted under 35 U.S.C. 154(b) by 262 days.

(21) Appl. No.: 13/801,509

(22) Filed: Mar. 13, 2013

(65) Prior Publication Data

US 2014/0114568 A1    Apr. 24, 2014

Related U.S. Application Data

(60) Provisional application No. 61/716,841, filed on Oct. 22, 2012.

(51) Int. Cl.
  *G01C 21/00*    (2006.01)
  *G01S 5/00*    (2006.01)
  (Continued)

(52) U.S. Cl.
  CPC .......... *G01C 21/206* (2013.01); *G01S 5/0045* (2013.01); *G01S 5/0263* (2013.01); *G01S 19/48* (2013.01)

(58) Field of Classification Search
  CPC ..... G01C 21/206; G01S 19/48; G01S 5/0263; G01S 5/0045
  (Continued)

(56) References Cited

U.S. PATENT DOCUMENTS

2009/0043504 A1    2/2009  Bandyopadhyay et al.
2010/0187406 A1*   7/2010  Van Dalen ............ G01J 1/4204
                                                250/214 AL
(Continued)

FOREIGN PATENT DOCUMENTS

CN    101387699 A    3/2009
CN    101779109 A    7/2010
(Continued)

OTHER PUBLICATIONS

Alcorn A., "How to Turn Off GPS in Private Places Using Tasker [Android]", Jul. 4, 2011 (Jul. 4, 2011) XP002718832, Retrieved from the Internet: URL: http://www.makeuseof.com/tag/turn-gps-private-places-tasker-android/ [retrieved on Jan. 16, 2014] the whole document.

(Continued)

*Primary Examiner* — Adam D Tissot
(74) *Attorney, Agent, or Firm* — Thien T. Nguyen

(57) ABSTRACT

In an embodiment, a user equipment (UE) tracks its location using a first positioning scheme (PS) (e.g., an indoor PS or outdoor PS) while operating inside or outside of an enclosed environment, whereby the UE maintains transition region information related to the enclosed environment that characterizes one or more outdoor-to-indoor (OI) and/or indoor-to-outdoor (IO) transition regions of the enclosed environment. If the UE determines it has entered a transition region of the enclosed environment based on its location tracking using the first PS, the UE begins to track its location using a second PS. When the quality of the second PS rises above a threshold (e.g., such as the UE moves further inside or outside of the enclosed environment), the UE can switch to the second PS and turn off the first PS.

26 Claims, 11 Drawing Sheets

(51) Int. Cl.
*G01C 21/20* (2006.01)
*G01S 19/48* (2010.01)
*G01S 5/02* (2010.01)
*H04W 4/00* (2018.01)

(58) Field of Classification Search
USPC .......................................................... 701/469
See application file for complete search history.

(56) References Cited

U.S. PATENT DOCUMENTS

| | | | |
|---|---|---|---|
| 2011/0050493 A1 | 3/2011 | Torimoto et al. | |
| 2011/0172906 A1* | 7/2011 | Das | G01C 21/20 |
| | | | 701/533 |
| 2012/0072052 A1* | 3/2012 | Powers | G05D 1/0044 |
| | | | 701/2 |
| 2012/0112958 A1 | 5/2012 | Alizadeh-Shabdiz et al. | |
| 2012/0150434 A1 | 6/2012 | Cho et al. | |
| 2012/0169535 A1 | 7/2012 | Kong et al. | |
| 2012/0214533 A1 | 8/2012 | Bakthavathsalu et al. | |
| 2013/0065604 A1* | 3/2013 | Werner | G01S 5/0263 |
| | | | 455/456.1 |
| 2013/0137450 A1* | 5/2013 | Dai | G01S 19/34 |
| | | | 455/456.1 |
| 2014/0002307 A1* | 1/2014 | Mole | G01S 5/0263 |
| | | | 342/451 |

FOREIGN PATENT DOCUMENTS

| | | |
|---|---|---|
| CN | 102721972 A | 10/2012 |
| JP | 2011069790 A | 4/2011 |
| JP | 2012093319 A | 5/2012 |
| WO | WO-2007025151 A2 | 3/2007 |

OTHER PUBLICATIONS

International Search Report and Written Opinion—PCT/US2013/066057—ISA/EPO—dated Jan. 27, 2014.

* cited by examiner

CHANGING A POSITION DETERMINATION SCHEME USED BY A USER EQUIPMENT DURING A TRANSITION BETWEEN INDOOR AND OUTDOOR SPACES RELATIVE TO AN ENCLOSED ENVIRONMENT

CLAIM OF PRIORITY UNDER 35 U.S.C. § 119

The present application for patent claims priority to Provisional Application No. 61/716,841 entitled "CHANGING A POSITION DETERMINATION SCHEME USED BY A USER EQUIPMENT DURING A TRANSITION BETWEEN INDOOR AND OUTDOOR SPACES RELATIVE TO AN ENCLOSED ENVIRONMENT", filed Oct. 22, 2012, and assigned to the assignee hereof and hereby expressly incorporated by reference herein.

BACKGROUND OF THE INVENTION

1. Field of the Invention

Embodiments of the invention relate to changing a position determination scheme used by a user equipment (UE) during a transition between indoor and outdoor spaces relative to an enclosed environment.

2. Description of the Related Art

It is typical for client devices (e.g., mobile devices such as cell phones) to be equipped with more than one positioning mechanism (or position determination scheme) for calculating their locations. For example, mobile devices can use satellite positioning systems (SPS) such as the Global Positioning System (GPS), terrestrial cellular stations, a hybrid between GPS and terrestrial cellular, radio frequency (RF) fingerprinting, WiFi positioning, forward link trilateration (FLT), advanced FLT (AFLT), and so on. Certain position determination schemes are more suited to outdoor environments (e.g., SPS, GPS, etc.), while other positioning schemes are more suited to indoor environments (e.g., WiFi positioning, etc.). However, it can be difficult to effectively transition between the position determination schemes during transitions between indoor and outdoor spaces. One option is to turn on, for example, both GPS and WiFi position determination schemes at all times so that when the mobile stations transitions between indoor and outdoor spaces, at least one suitable position determination scheme is available. However, leaving either of the position determination schemes on indiscriminately can degrade the battery life of the mobile station.

SUMMARY

In an embodiment, a user equipment (UE) tracks its location using a first positioning scheme (PS) (e.g., an indoor PS or outdoor PS) while operating inside or outside of an enclosed environment, whereby the UE maintains transition region information related to the enclosed environment that characterizes one or more outdoor-to-indoor (OI) and/or indoor-to-outdoor (IO) transition regions of the enclosed environment. If the UE determines it has entered a transition region of the enclosed environment based on its location tracking using the first PS, the UE begins to track its location using a second PS. When the quality of the second PS rises above a threshold (e.g., such as the UE moves further inside or outside of the enclosed environment), the UE can switch to the second PS and turn off the first PS.

BRIEF DESCRIPTION OF THE DRAWINGS

A more complete appreciation of embodiments of the invention and many of the attendant advantages thereof will be readily obtained as the same becomes better understood by reference to the following detailed description when considered in connection with the accompanying drawings which are presented solely for illustration and not limitation of the invention, and in which:

FIG. 6B illustrates an example of how the indoor-to-outdoor transition regions for the enclosed environment of FIG. 6A can be configured within a transition region database in accordance with an embodiment of the invention.

DETAILED DESCRIPTION

Figure 1:
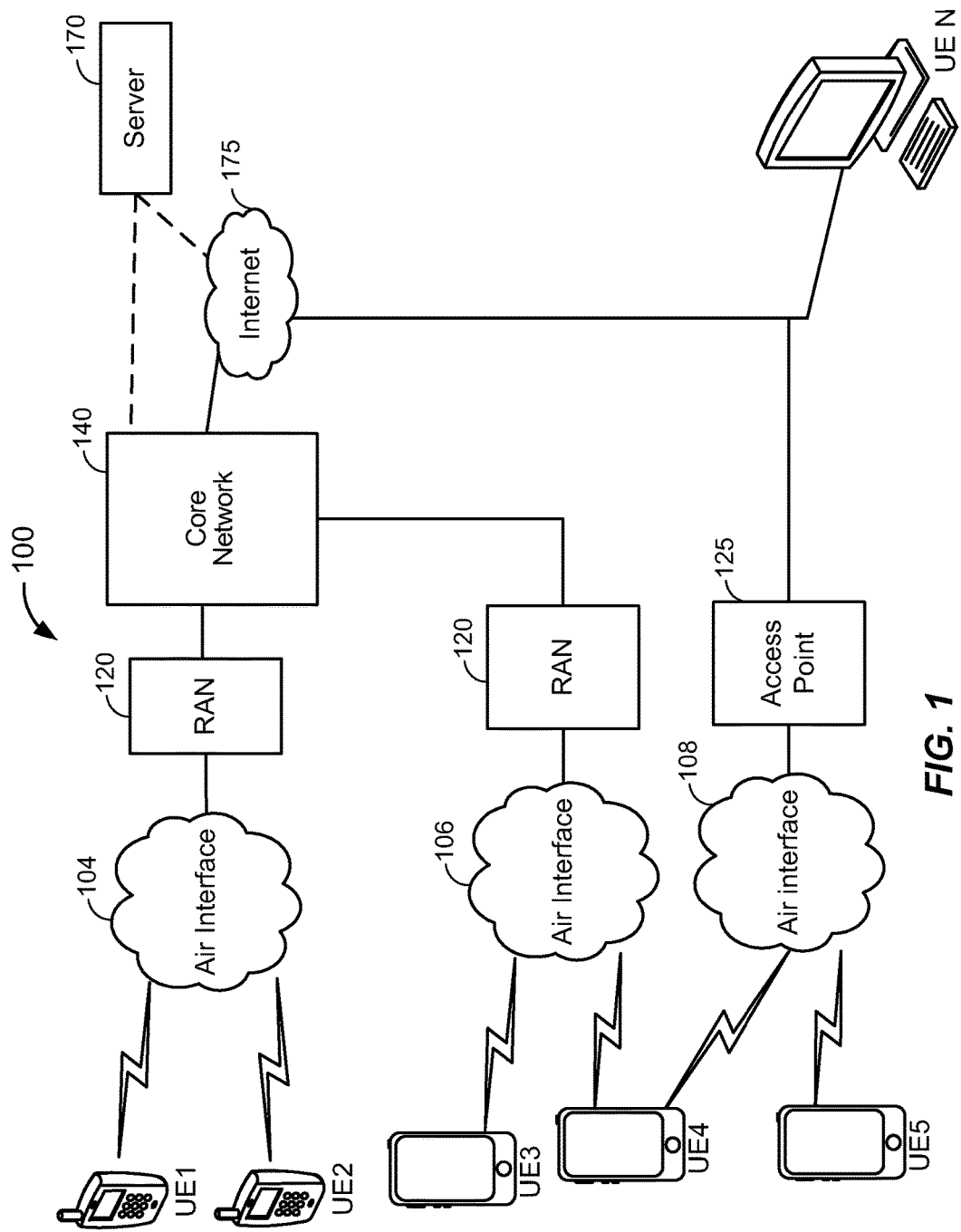
FIG. 1 illustrates a high-level system architecture of a wireless communications system in accordance with an embodiment of the invention.

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The words "exemplary" and/or "example" are used herein to mean "serving as an example, instance, or illustration."

Any embodiment described herein as "exemplary" and/or "example" is not necessarily to be construed as preferred or advantageous over other embodiments. Likewise, the term "embodiments of the invention" does not require that all embodiments of the invention include the discussed feature, advantage or mode of operation.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

A client device, referred to herein as a user equipment (UE), may be mobile or stationary, and may communicate with a radio access network (RAN). As used herein, the term "UE" may be referred to interchangeably as an "access terminal" or "AT", a "wireless device", a "subscriber device", a "subscriber terminal", a "subscriber station", a "user terminal" or UT, a "mobile terminal", a "mobile station" and variations thereof. Generally, UEs can communicate with a core network via the RAN, and through the core network the UEs can be connected with external networks such as the Internet. Of course, other mechanisms of connecting to the core network and/or the Internet are also possible for the UEs, such as over wired access networks, WiFi networks (e.g., based on IEEE 802.11, etc.) and so on. UEs can be embodied by any of a number of types of devices including but not limited to PC cards, compact flash devices, external or internal modems, wireless or wireline phones, and so on. A communication link through which UEs can send signals to the RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

FIG. 1 illustrates a high-level system architecture of a wireless communications system 100 in accordance with an embodiment of the invention. The wireless communications system 100 contains UEs 1 . . . N. The UEs 1 . . . N can include cellular telephones, personal digital assistant (PDAs), pagers, a laptop computer, a desktop computer, and so on. For example, in FIG. 1, UEs 1 . . . 2 are illustrated as cellular calling phones, UEs 3 . . . 5 are illustrated as cellular touchscreen phones or smart phones, and UE N is illustrated as a desktop computer or PC.

Referring to FIG. 1, UEs 1 . . . N are configured to communicate with an access network (e.g., the RAN 120, an access point 125, etc.) over a physical communications interface or layer, shown in FIG. 1 as air interfaces 104, 106, 108 and/or a direct wired connection. The air interfaces 104 and 106 can comply with a given cellular communications protocol (e.g., CDMA, EVDO, eHRPD, GSM, EDGE, W-CDMA, LTE, etc.), while the air interface 108 can comply with a wireless IP protocol (e.g., IEEE 802.11). The RAN 120 includes a plurality of access points that serve UEs over air interfaces, such as the air interfaces 104 and 106. The access points in the RAN 120 can be referred to as access nodes or ANs, access points or APs, base stations or BSs, Node Bs, eNode Bs, and so on. These access points can be terrestrial access points (or ground stations), or satellite access points. The RAN 120 is configured to connect to a core network 140 that can perform a variety of functions, including bridging circuit switched (CS) calls between UEs served by the RAN 120 and other UEs served by the RAN 120 or a different RAN altogether, and can also mediate an exchange of packet-switched (PS) data with external networks such as Internet 175. The Internet 175 includes a number of routing agents and processing agents (not shown in FIG. 1 for the sake of convenience). In FIG. 1, UE N is shown as connecting to the Internet 175 directly (i.e., separate from the core network 140, such as over an Ethernet connection of WiFi or 802.11-based network). The Internet 175 can thereby function to bridge packet-switched data communications between UE N and UEs 1 . . . N via the core network 140. Also shown in FIG. 1 is the access point 125 that is separate from the RAN 120. The access point 125 may be connected to the Internet 175 independent of the core network 140 (e.g., via an optical communication system such as FiOS, a cable modem, etc.). The air interface 108 may serve UE 4 or UE 5 over a local wireless connection, such as IEEE 802.11 in an example. UE N is shown as a desktop computer with a wired connection to the Internet 175, such as a direct connection to a modem or router, which can correspond to the access point 125 itself in an example (e.g., for a WiFi router with both wired and wireless connectivity).

Referring to FIG. 1, a server 170 is shown as connected to the Internet 175, the core network 140, or both. The server 170 can be implemented as a plurality of structurally separate servers, or alternately may correspond to a single server. As will be described below in more detail, the server 170 is configured to support one or more communication services (e.g., Voice-over-Internet Protocol (VoIP) sessions, Push-to-Talk (PTT) sessions, group communication sessions, social networking services, etc.) for UEs that can connect to the server 170 via the core network 140 and/or the Internet 175, and/or to provide content (e.g., web page downloads) to the UEs.

Figure 2:
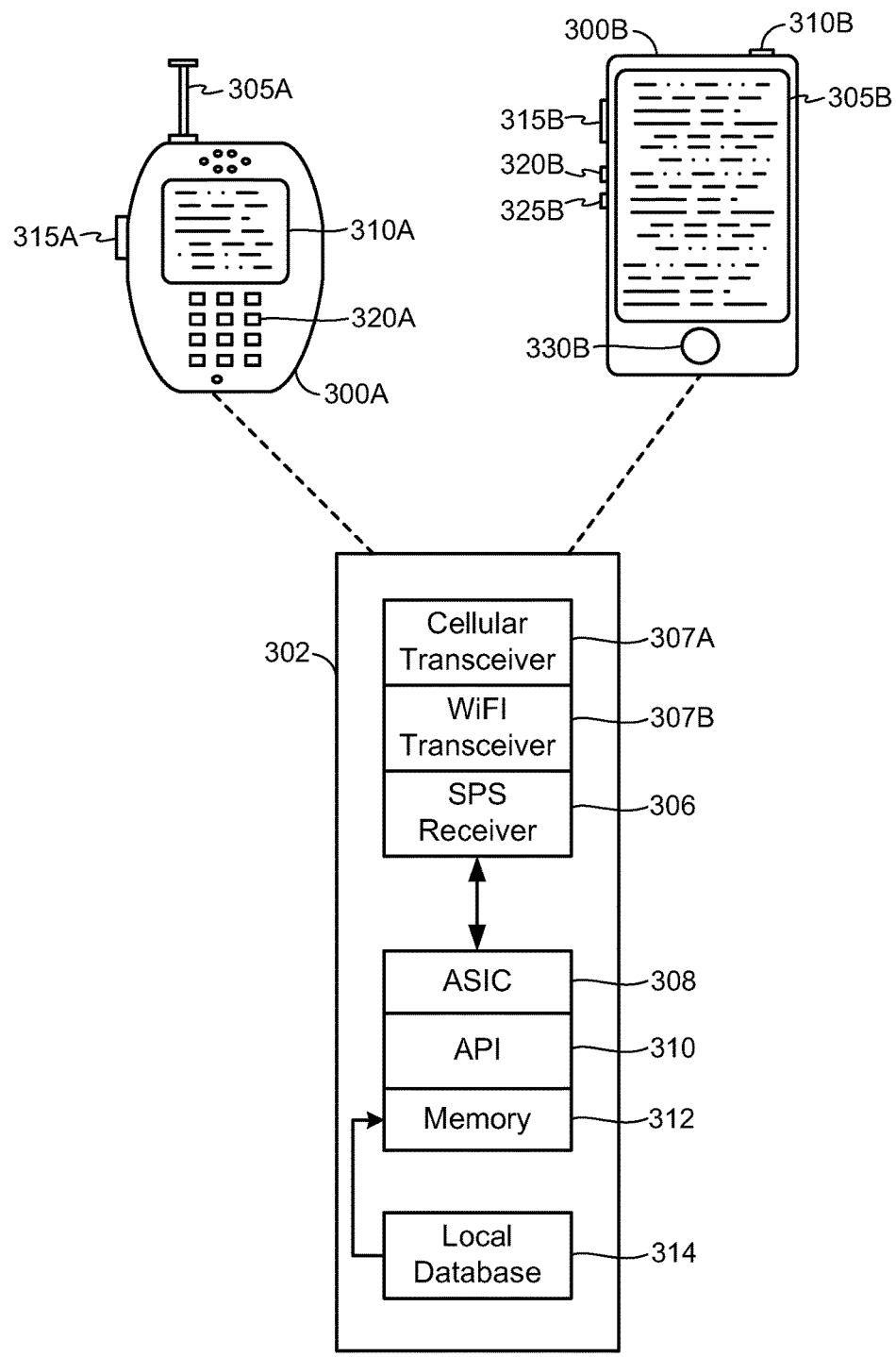
FIG. 2 illustrates examples of user equipments (UEs) in accordance with embodiments of the invention.

FIG. 2 illustrates examples of UEs (i.e., client devices) in accordance with embodiments of the invention. Referring to FIG. 2, UE 300A is illustrated as a calling telephone and UE 300B is illustrated as a touchscreen device (e.g., a smart phone, a tablet computer, etc.). As shown in FIG. 2, an external casing of UE 300A is configured with an antenna 305A, display 310A, at least one button 315A (e.g., a PTT button, a power button, a volume control button, etc.) and a keypad 320A among other components, as is known in the art. Also, an external casing of UE 300B is configured with a touchscreen display 305B, peripheral buttons 310B, 315B, 320B and 325B (e.g., a power control button, a volume or vibrate control button, an airplane mode toggle button, etc.), at least one front-panel button 330B (e.g., a Home button, etc.), among other components, as is known in the art. While not shown explicitly as part of UE 300B, the UE 300B can include one or more external antennas and/or one or more integrated antennas that are built into the external casing of UE 300B, including but not limited to WiFi antennas, cellular antennas, satellite position system (SPS) antennas (e.g., global positioning system (GPS) antennas), and so on.

While internal components of UEs such as the UEs 300A and 300B can be embodied with different hardware configurations, a basic high-level UE configuration for internal hardware components is shown as platform 302 in FIG. 2. The platform 302 can receive and execute software applications, data and/or commands transmitted from the RAN 120 that may ultimately come from the core network 140, the Internet 175 and/or other remote servers and networks (e.g., application server 170, web URLs, etc.). The platform 302 can also independently execute locally stored applications without RAN interaction. The platform 302 can include a satellite positioning system (SPS) receiver 306 (e.g., for detecting SPS signals, such as GPS signals), at least one cellular transceiver 307A (e.g., for communicating with one or more cellular networks) and a WiFi transceiver 307B (e.g., for communicating with WiFi networks). Each of 306, 307A and 307B are operably coupled to an application specific integrated circuit (ASIC) 308, or other processor, microprocessor, logic circuit, or other data processing device. Other transceivers or receives can also be included on the platform 302, such as Bluetooth transceivers, etc. The ASIC 308 or other processor executes the application programming interface (API) 310 layer that interfaces with any resident programs in the memory 312 of the wireless device. The memory 312 can be comprised of read-only or random-access memory (RAM and ROM), EEPROM, flash cards, or any memory common to computer platforms. The platform 302 also can include a local database 314 that can store applications not actively used in memory 312, as well as other data. The local database 314 is typically a flash memory cell, but can be any secondary storage device as known in the art, such as magnetic media, EEPROM, optical media, tape, soft or hard disk, or the like.

Accordingly, an embodiment of the invention can include a UE (e.g., UE 300A, 300B, etc.) including the ability to perform the functions described herein. As will be appreciated by those skilled in the art, the various logic elements can be embodied in discrete elements, software modules executed on a processor or any combination of software and hardware to achieve the functionality disclosed herein. For example, ASIC 308, memory 312, API 310 and local database 314 may all be used cooperatively to load, store and execute the various functions disclosed herein and thus the logic to perform these functions may be distributed over various elements. Alternatively, the functionality could be incorporated into one discrete component. Therefore, the features of the UEs 300A and 300B in FIG. 2 are to be considered merely illustrative and the invention is not limited to the illustrated features or arrangement.

The wireless communication between the UEs 300A and/or 300B and the RAN 120 can be based on different technologies, such as CDMA, W-CDMA, time division multiple access (TDMA), frequency division multiple access (FDMA), Orthogonal Frequency Division Multiplexing (OFDM), GSM, or other protocols that may be used in a wireless communications network or a data communications network. As discussed in the foregoing and known in the art, voice transmission and/or data can be transmitted to the UEs from the RAN using a variety of networks and configurations. Accordingly, the illustrations provided herein are not intended to limit the embodiments of the invention and are merely to aid in the description of aspects of embodiments of the invention.

Figure 3:
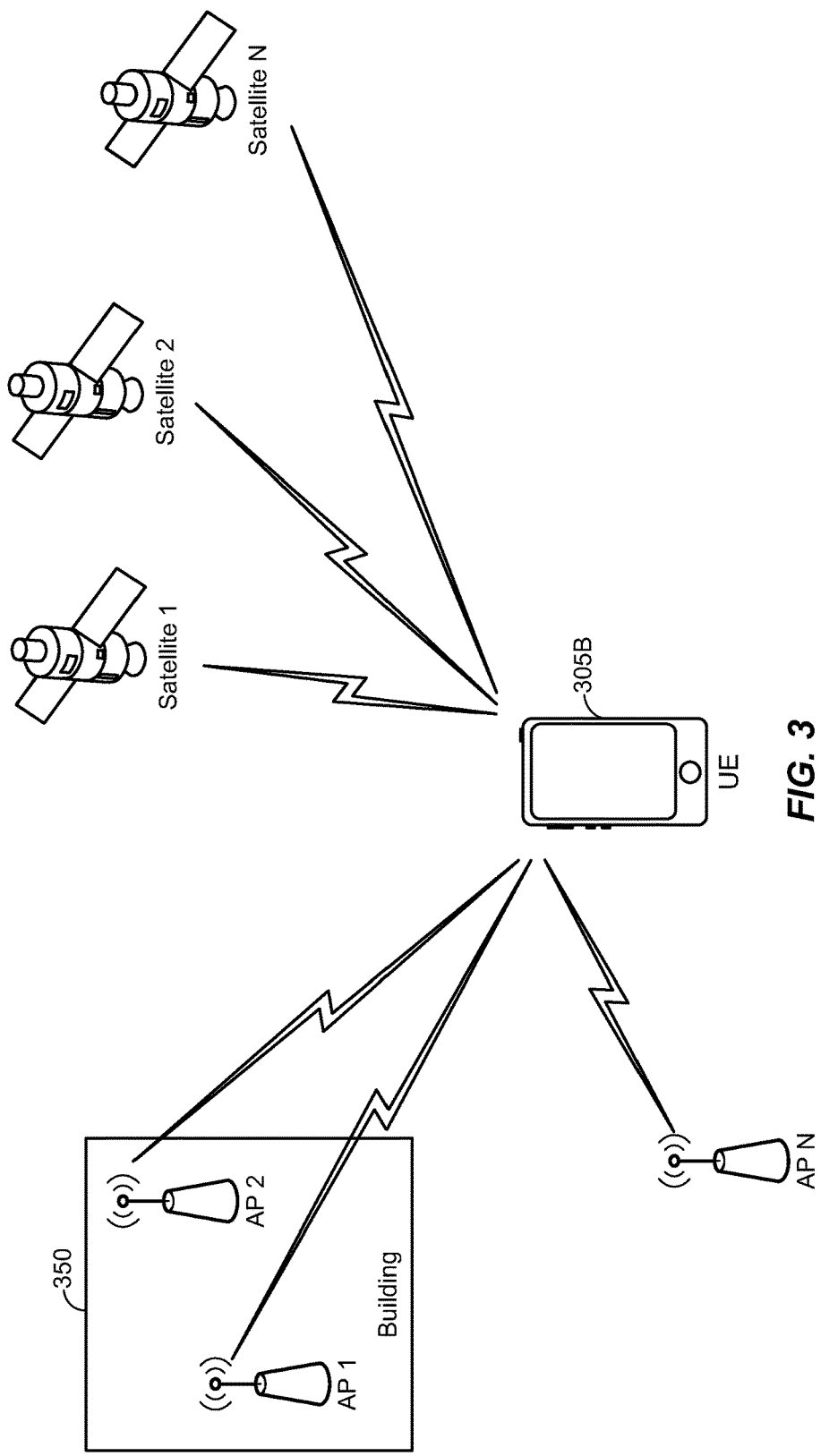
FIG. 3 illustrates different position determination systems that can be connected to the UEs from FIG. 2 in accordance with an embodiment of the invention.

FIG. 3 illustrates different position determination systems that can be connected to the UE 305B from FIG. 2 in accordance with an embodiment of the invention. In particular, a WiFi position determination system is represented in FIG. 3 by WiFI APs 1 . . . N, and an SPS position determination system is represented in FIG. 3 by SPS satellites 1 . . . N. APs 1 and 2 are shown as positioned within a building 350, and can thereby be characterized as "indoor" APs, whereas AP N as well as satellites 1 . . . N are "outdoor" entities.

Figure 4:
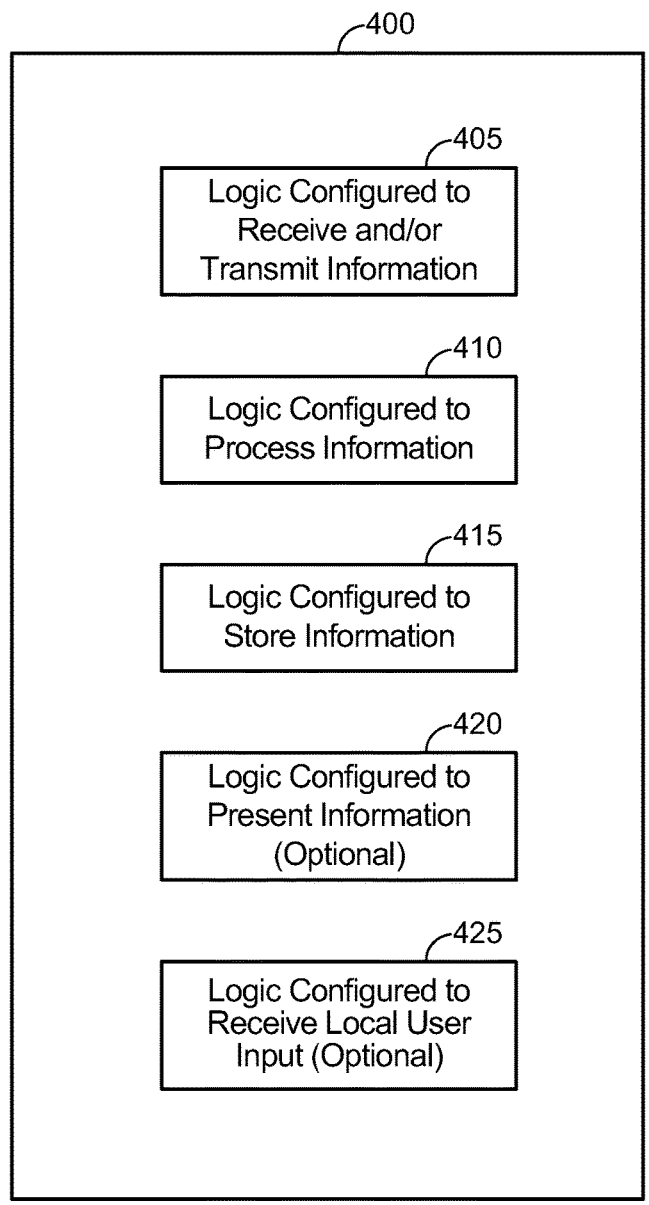
FIG. 4 illustrates a communication device that includes logic configured to perform functionality in accordance with an embodiment of the invention.

FIG. 4 illustrates a communication device 400 that includes logic configured to perform functionality. The communication device 400 can correspond to any of the above-noted communication devices, including but not limited to UEs 300A or 300B, any component of the RAN 120, any component of the core network 140, any components coupled with the core network 140 and/or the Internet 175 (e.g., the server 170), and so on. Thus, communication device 400 can correspond to any electronic device that is configured to communicate with (or facilitate communication with) one or more other entities over the wireless communications system 100 of FIG. 1.

Referring to FIG. 4, the communication device 400 includes logic configured to receive and/or transmit information 405. In an example, if the communication device 400 corresponds to a wireless communications device (e.g., UE 300A or 300B, AP 125, a BS, Node B or eNodeB in the RAN 120, etc.), the logic configured to receive and/or transmit information 405 can include a wireless communications interface (e.g., Bluetooth, WiFi, 2G, CDMA, W-CDMA, 3G, 4G, LTE, etc.) such as a wireless transceiver and associated hardware (e.g., an RF antenna, a MODEM, a modulator and/or demodulator, etc.). In another example, the logic configured to receive and/or transmit information 405 can correspond to a wired communications interface (e.g., a serial connection, a USB or Firewire connection, an Ethernet connection through which the Internet 175 can be accessed, etc.). Thus, if the communication device 400 corresponds to some type of network-based server (e.g., server 170, etc.), the logic configured to receive and/or transmit information 405 can correspond to an Ethernet card, in an example, that connects the network-based server to other communication entities via an Ethernet protocol. In a further example, the logic configured to receive and/or transmit information 405 can include sensory or measurement hardware by which the communication device 400 can monitor its local environment (e.g., an accelerometer, a temperature sensor, a light sensor, an antenna for monitoring local RF signals, etc.). The logic configured to receive and/or transmit information 405 can also include software that, when executed, permits the associated hardware of the logic configured to receive and/or transmit information 405 to perform its reception and/or transmission function(s). However, the logic configured to receive and/or transmit information 405 does not correspond to software alone, and the logic configured to receive and/or transmit information 405 relies at least in part upon hardware to achieve its functionality.

Referring to FIG. 4, the communication device 400 further includes logic configured to process information 410. In an example, the logic configured to process information 410 can include at least a processor. Example implementations of the type of processing that can be performed by the logic configured to process information 410 includes but is not limited to performing determinations, establishing connections, making selections between different information options, performing evaluations related to data, interacting with sensors coupled to the communication device 400 to perform measurement operations, converting information from one format to another (e.g., between different protocols such as .wmv to .avi, etc.), and so on. For example, the processor included in the logic configured to process information 410 can correspond to a general purpose processor, a digital signal processor (DSP), an ASIC, a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The logic configured to process information 410 can also include software that, when executed, permits the associated hardware of the logic configured to process information 410 to perform its processing function(s). However, the logic configured to process information 410 does not correspond to software alone, and the logic configured to process information 410 relies at least in part upon hardware to achieve its functionality.

Referring to FIG. 4, the communication device 400 further includes logic configured to store information 415. In an example, the logic configured to store information 415 can include at least a non-transitory memory and associated hardware (e.g., a memory controller, etc.). For example, the non-transitory memory included in the logic configured to store information 415 can correspond to RAM memory, flash memory, ROM memory, EPROM memory, EEPROM memory, registers, hard disk, a removable disk, a CD-ROM, or any other form of storage medium known in the art. The logic configured to store information 415 can also include software that, when executed, permits the associated hardware of the logic configured to store information 415 to perform its storage function(s). However, the logic configured to store information 415 does not correspond to software alone, and the logic configured to store information 415 relies at least in part upon hardware to achieve its functionality.

Referring to FIG. 4, the communication device 400 further optionally includes logic configured to present information 420. In an example, the logic configured to present information 420 can include at least an output device and associated hardware. For example, the output device can include a video output device (e.g., a display screen, a port that can carry video information such as USB, HDMI, etc.), an audio output device (e.g., speakers, a port that can carry audio information such as a microphone jack, USB, HDMI, etc.), a vibration device and/or any other device by which information can be formatted for output or actually outputted by a user or operator of the communication device 400. For example, if the communication device 400 corresponds to UE 300A or UE 300B as shown in FIG. 2, the logic configured to present information 420 can include the display 310A of UE 300A or the touchscreen display 305B of UE 300B. In a further example, the logic configured to present information 420 can be omitted for certain communication devices, such as network communication devices that do not have a local user (e.g., network switches or routers, remote servers such as the server 170, etc.). The logic configured to present information 420 can also include software that, when executed, permits the associated hardware of the logic configured to present information 420 to perform its presentation function(s). However, the logic configured to present information 420 does not correspond to software alone, and the logic configured to present information 420 relies at least in part upon hardware to achieve its functionality.

Referring to FIG. 4, the communication device 400 further optionally includes logic configured to receive local user input 425. In an example, the logic configured to receive local user input 425 can include at least a user input device and associated hardware. For example, the user input device can include buttons, a touchscreen display, a keyboard, a camera, an audio input device (e.g., a microphone or a port that can carry audio information such as a microphone jack, etc.), and/or any other device by which information can be received from a user or operator of the communication device 400. For example, if the communication device 400 corresponds to UE 300A or UE 300B as shown in FIG. 2, the logic configured to receive local user input 425 can include the keypad 320A, any of the buttons 315A or 310B through 325B, the touchscreen display 305B, etc. In a further example, the logic configured to receive local user input 425 can be omitted for certain communication devices, such as network communication devices that do not have a local user (e.g., network switches or routers, remote servers such as the server 170, etc.). The logic configured to receive local user input 425 can also include software that, when executed, permits the associated hardware of the logic configured to receive local user input 425 to perform its input reception function(s). However, the logic configured to receive local user input 425 does not correspond to software alone, and the logic configured to receive local user input 425 relies at least in part upon hardware to achieve its functionality.

Referring to FIG. 4, while the configured logics of 405 through 425 are shown as separate or distinct blocks in FIG. 4, it will be appreciated that the hardware and/or software by which the respective configured logic performs its functionality can overlap in part. For example, any software used to facilitate the functionality of the configured logics of 405 through 425 can be stored in the non-transitory memory associated with the logic configured to store information 415, such that the configured logics of 405 through 425 each performs their functionality (i.e., in this case, software execution) based in part upon the operation of software stored by the logic configured to store information 415. Likewise, hardware that is directly associated with one of the configured logics can be borrowed or used by other configured logics from time to time. For example, the processor of the logic configured to process information 410 can format data into an appropriate format before being transmitted by the logic configured to receive and/or transmit information 405, such that the logic configured to receive and/or transmit information 405 performs its functionality (i.e., in this case, transmission of data) based in part upon the operation of hardware (i.e., the processor) associated with the logic configured to process information 410.

Generally, unless stated otherwise explicitly, the phrase "logic configured to" as used throughout this disclosure is intended to invoke an embodiment that is at least partially implemented with hardware, and is not intended to map to software-only implementations that are independent of hardware. Also, it will be appreciated that the configured logic or "logic configured to" in the various blocks are not limited to specific logic gates or elements, but generally refer to the ability to perform the functionality described herein (either via hardware or a combination of hardware and software). Thus, the configured logics or "logic configured to" as illustrated in the various blocks are not necessarily implemented as logic gates or logic elements despite sharing the word "logic." Other interactions or cooperation between the logic in the various blocks will become clear to one of ordinary skill in the art from a review of the embodiments described below in more detail.

Figure 5:
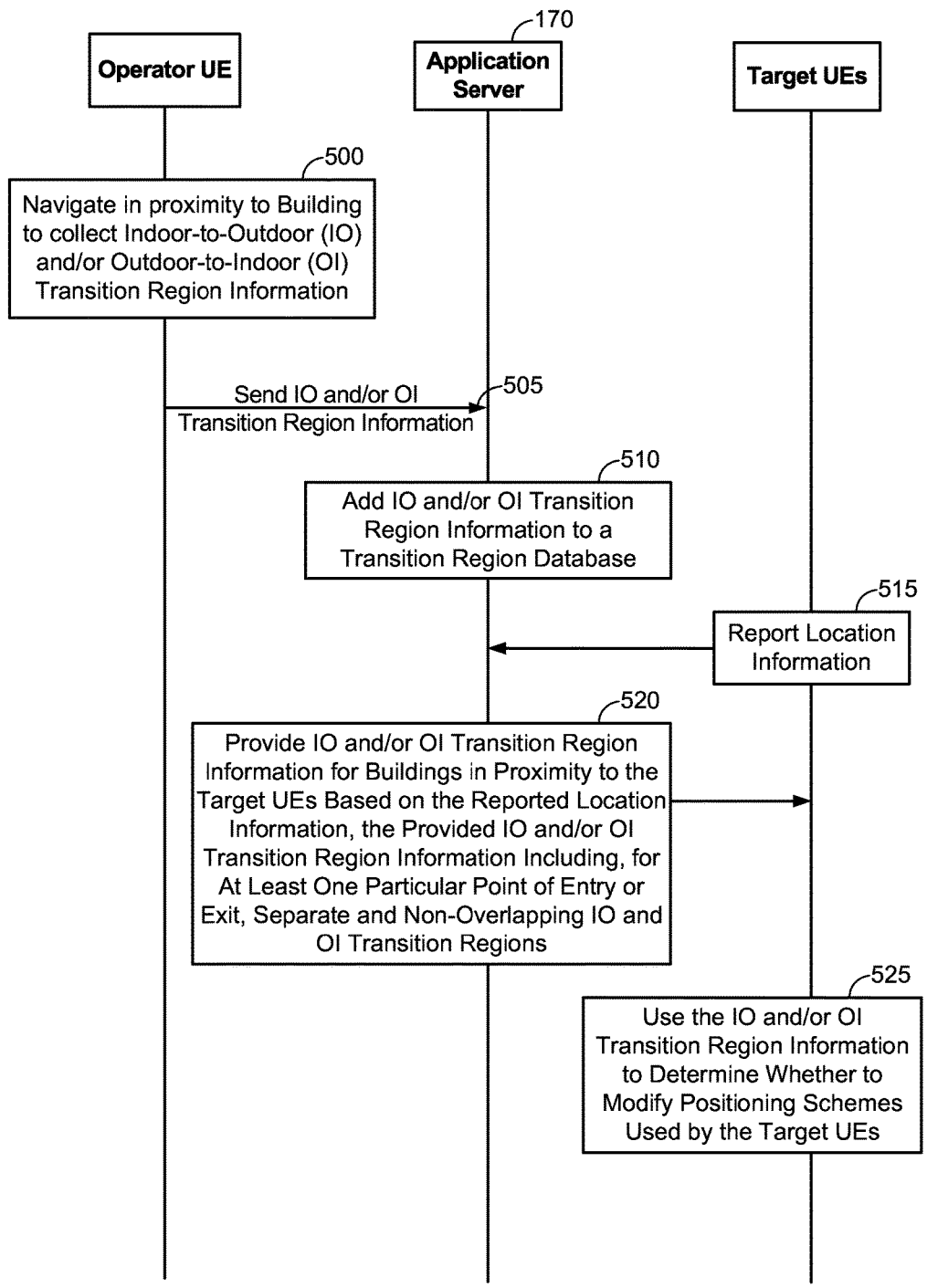
FIG. 5 illustrates a process by which information pertaining to an indoor-to-outdoor transition region and/or an outdoor-to-indoor transition region for an enclosed environment (or building) can be generated and then selectively distributed to a set of target UEs in accordance with an embodiment of the invention.

FIG. 5 illustrates a process by which information pertaining to an indoor-to-outdoor transition region and/or an outdoor-to-indoor transition region for an enclosed environment (or building) can be generated and then selectively distributed to a set of target UEs in accordance with an embodiment of the invention. Referring to FIG. 5, the enclosed environment does not need to be fully enclosed (e.g., some of its windows may be open, etc.) so long as there is a substantial partition due to infrastructure between an indoor space and an outdoor space relative to the enclosed environment.

Referring to FIG. 5, an operator navigates in proximity to the enclosed environment to measure location information that characterizes the indoor-to-outdoor transition region, the outdoor-to-indoor transition region, or both, 500. For example, the operator UE may correspond to a UE controlled by an operator of the premises (or building) of the enclosed environment, or can alternately correspond to a device associated with the application server 170. As an example, at 500, a user of the operator UE may identify the entrances and exits of the enclosed environment, may walk to these entrances and exits with the operator UE, and may log location information in proximity to these locations (e.g., as measured with respect to a WiFi position determination system by the operator UE).

Figure 6A:
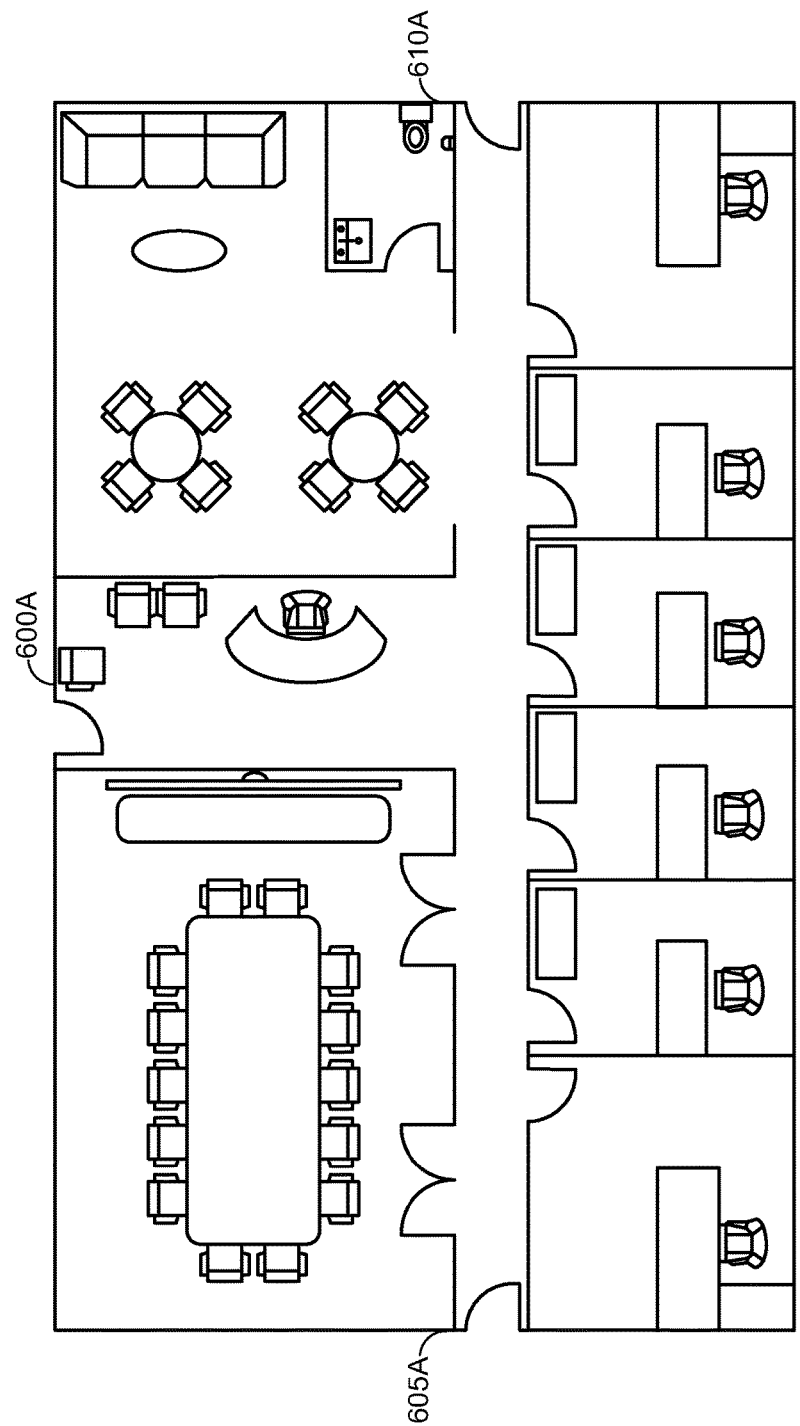
FIG. 6A illustrates an example of the enclosed environment that can be measured by an operator UE of FIG. 5.

FIG. 6A illustrates an example of the enclosed environment that can be measured by the operator UE at 500 of FIG. 5. In FIG. 6A, the enclosed environment corresponds to a floor of an office building with three points of entry and exit, denoted as 600A, 605A and 610A. These points of entry and exit are shown as corresponding to doorways in FIG. 6A, but alternative points of entry and exit can correspond to windows or other areas that can permit an individual to pass into or out of the enclosed environment.

Turning back to FIG. 5, after measuring the location information that characterizes the indoor-to-outdoor transition region, the outdoor-to-indoor transition region, or both, the operator UE transmits the measured location information to the application server 170, 505, and the application server 170 adds the measured location information to a transition region database, 510. The transition region database can include indoor-to-outdoor transition regions and/or outdoor-to-indoor transition regions for a plurality of enclosed environments, not merely the enclosed environment that was measured at 500 by the operator UE.

Figure 6B:
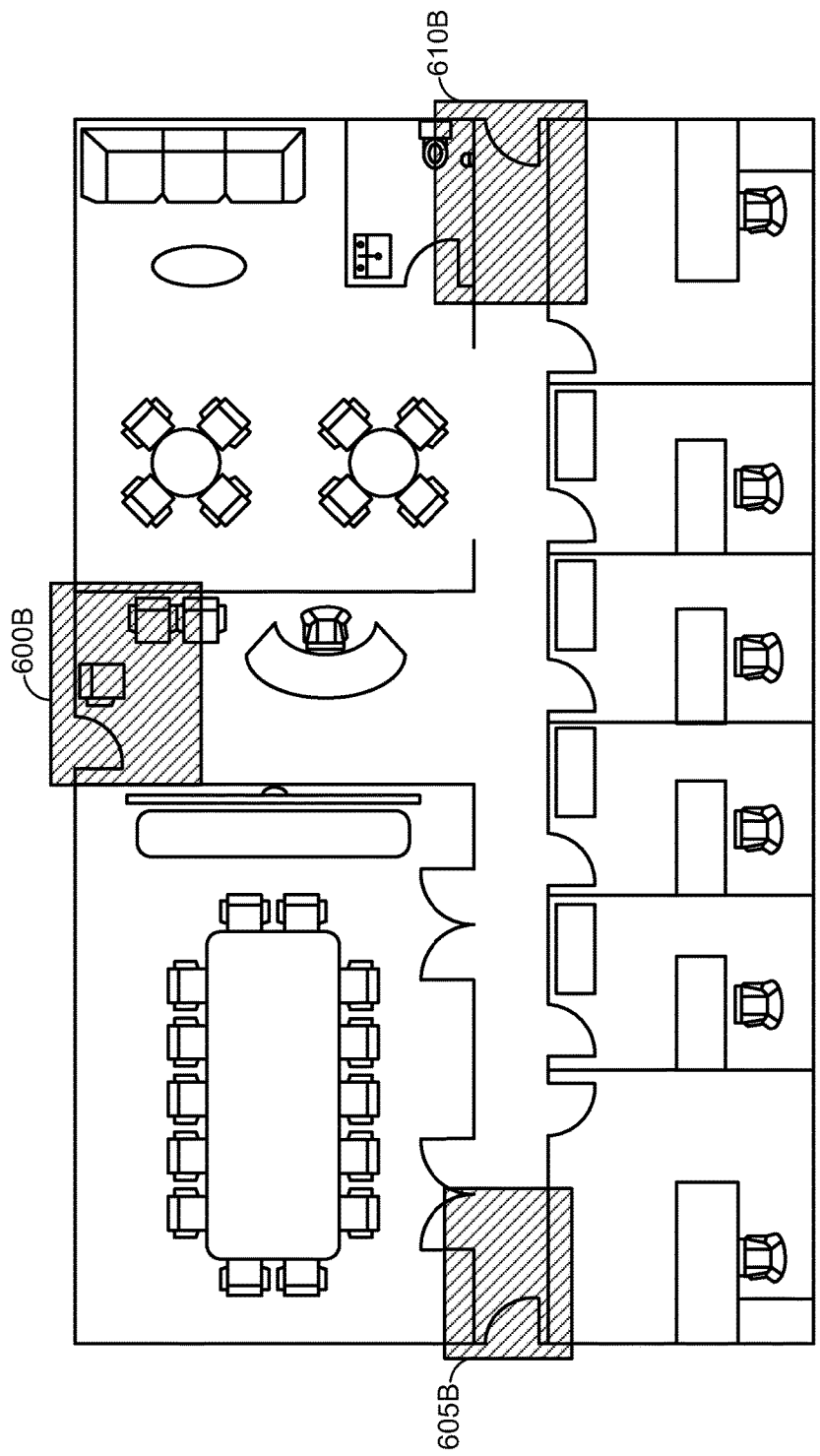
FIG. 6B illustrates an example of how the indoor-to-outdoor transition region for the enclosed environment of FIG. 6A can be configured within a transition region database in accordance with an embodiment of the invention.
Figure 6C:
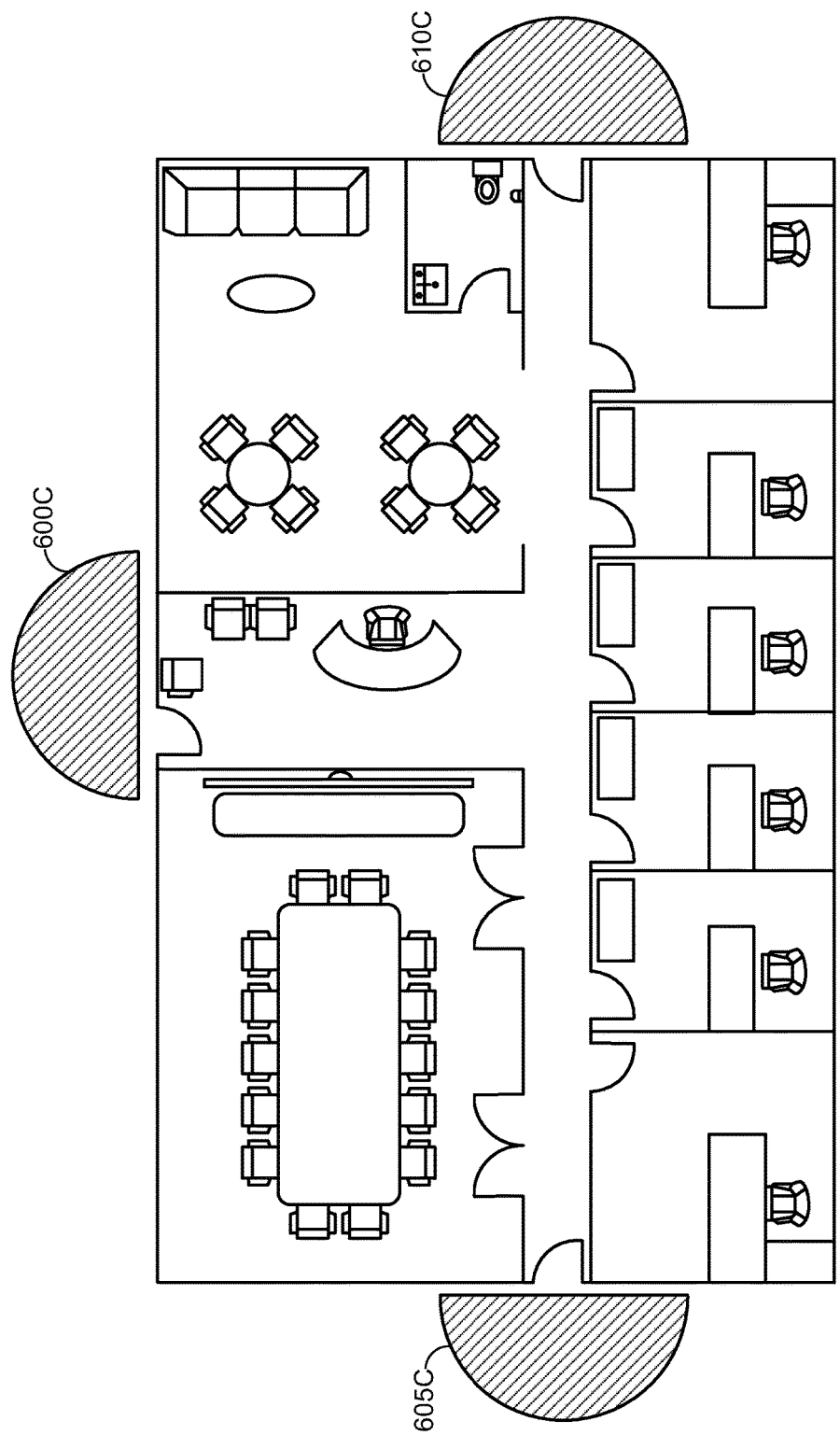
FIG. 6C illustrates an example of how the outdoor-to-indoor transition regions for the enclosed environment of FIG. 6A can be configured within a transition region database in accordance with an embodiment of the invention.
Figure 6D:
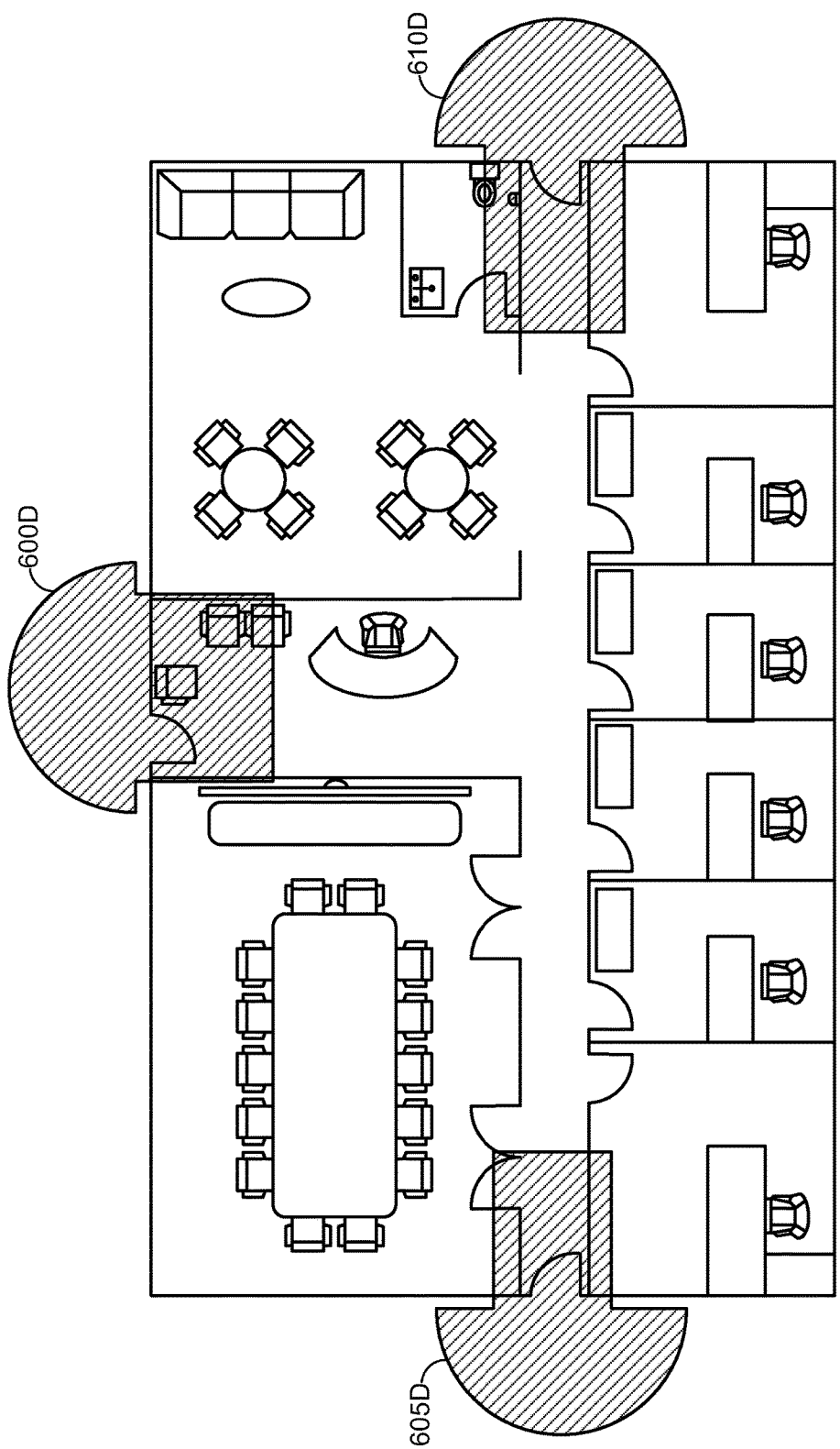
FIG. 6D illustrates an example of how a combination of the indoor-to-outdoor transition regions and the outdoor-to-indoor transition regions for the enclosed environment of FIG. 6A can be configured within a transition region database in accordance with an embodiment of the invention.

FIGS. 6B-6D illustrate examples of how the indoor-to-outdoor transition regions and/or outdoor-to-indoor transition regions for the office space of FIG. 6A can be configured within the transition region database at 510. In FIG. 6B, indoor-to-outdoor transition regions 600B, 605B and 610B are shown as being substantially within the indoor area of the office space in proximity to the doorways 600A, 605A and 610A from FIG. 6A. In FIG. 6C, outdoor-to-indoor transition regions 600C, 605C and 610C are shown as being substantially within the outdoor area of the office space in proximity to the doorways 600A, 605A and 610A from FIG. 6A. In FIG. 6D, both the indoor-to-outdoor transition regions from FIG. 6B and the outdoor-to-indoor transition regions are shown as being overlaid with each other as hybrid transition regions 600D, 605D and 610D.

Turning back to FIG. 5, one or more target UEs report location information to the application server 170 that indicates their approximate location (e.g., their geographic coordinates based on GPS, their current serving sectors, etc.), 515. The application server 170 provides transition region information related to the indoor-to-outdoor transition regions and/or the outdoor-to-indoor transition regions from the transition region database based on the reported location information, 520. For example, the application server 170 can filter out transition region information for enclosed environments that are not proximate to the respective target UEs. The application server 170 can also filter out transition region information for enclosed environments that are proximate to the respective target UEs but are deemed unlikely to receive a visit from the users of the respective target UEs (e.g., users that do not drink coffee will not be provided with transition region information for coffee shops, users that do not work at a commercial office building will not receive transition region information for that commercial office building, etc.). Likewise, the application server 170 can also include transition region information for enclosed environments that are proximate to the respective target UEs and are deemed likely to receive a visit from the users of the respective target UEs (e.g., users that have a habit of smoking can be provided with transition region information for a nearby cigar shop, etc.).

The one or more target UEs receive the transition region information from the application server 170, and then use the transition region information to determine whether to modify a position determination scheme used by the one or more target UEs, 525. Examples of how 525 can be implemented are provided in more detail below with respect to FIG. 7.

While FIG. 5 is directed to a scenario where the transition region information is aggregated at the application server 170 and then disseminated to target UEs by the application server 170, it will be appreciated that other embodiments can be directed to different mechanisms by which the transition information region can be conveyed to the target UEs. For example, a given target UE can use its own history of moving into and/or out of a given enclosed environment to identify transition regions between an indoor space and an outdoor space of the given enclosed environment. The target UEs can also generate and then share transition region information among themselves via ad hoc or peer-to-peer (P2P) protocols. Accordingly, it will be appreciated direct server interaction need not be used for obtaining the transition region information in at least one embodiment of the invention.

Figure 7:
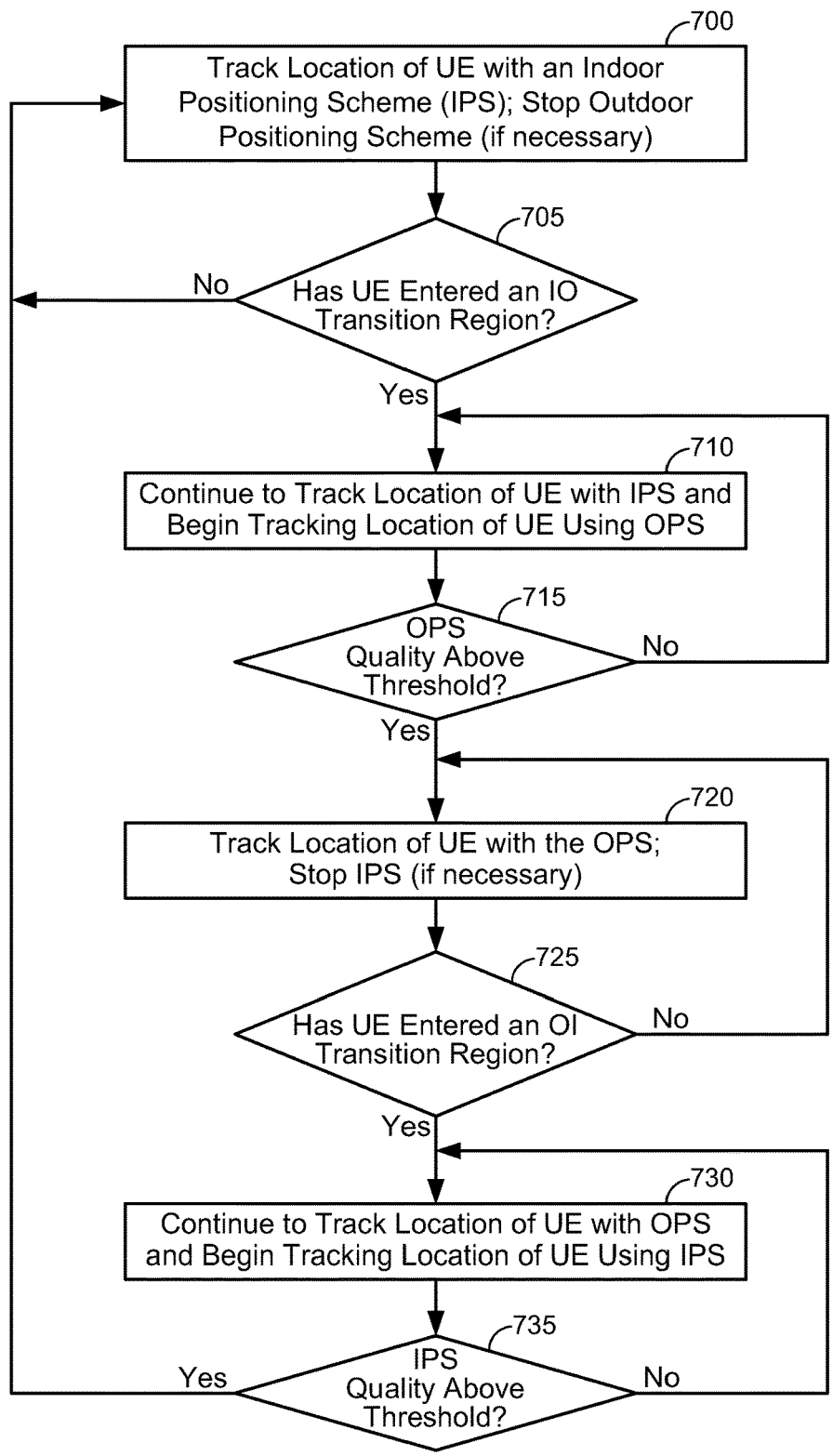
FIG. 7 is directed to a process of dynamically changing a position determination scheme used by a given UE during transitions between an indoor space and an outdoor space relative to a particular enclosed environment (e.g., a building) in accordance with an embodiment of the invention.

FIG. 7 is directed to a process of dynamically changing a position determination scheme used by a given UE during transitions between an indoor space and an outdoor space relative to a particular enclosed environment (e.g., a building) in accordance with an embodiment of the invention. In the embodiment of FIG. 7, assume that the given UE is provisioned with transition region information that characterizes both an indoor-to-outdoor transition region (or IO transition region) and an outdoor-to-indoor transition region (or OI transition region) associated with the particular enclosed environment. Further assume that the given UE is configured as in FIG. 3, whereby the given UE is equipped with an indoor positioning scheme (or IPS) (e.g., a WiFi-based positioning scheme, etc.) that can be used at least within the particular enclosed environment and an outdoor positioning scheme (or OPS) (e.g., GPS, etc.) that can be used at least outside of (and in proximity to) the particular enclosed environment. For example, in case of GPS, a sufficient number of GPS satellites may be in view outside of the enclosed environment (but not necessarily inside the enclosed environment at all interior locations), such that GPS can be used as the outdoor positioning scheme. In another example, in case of the WiFi-based positioning scheme, indoor APs (e.g., such as APs 1 and 2 in FIG. 3) can have signals that are used to determine the given UE's relative position in the enclosed environment. However, these WiFi signals may not have sufficient strength to extend very far past the boundaries of the enclosed environment, such that the WiFi-based positioning scheme can be used as the indoor positioning scheme in the enclosed environment. It will be readily appreciated that other types of positioning schemes can be used as the indoor or outdoor positioning schemes in other embodiments of the invention, and FIG. 7 is described with respect to GPS as the outdoor positioning scheme and WiFi as the indoor positioning scheme to promote clarity and for convenience of explanation (not to exclude other positioning schemes). In particular, for the indoor positioning scheme, any positioning scheme that can operate in the enclosed environment at a level of granularity to detect when entry into the IO transition region has occurred can be used as the indoor positioning scheme (e.g., indoor WiFi, Bluetooth, RF fingerprinting, etc.). Similarly, for the outdoor positioning scheme, any positioning scheme that can operate outside of the enclosed environment at a level of granularity to detect when entry into the OI transition region has occurred can be used as the outdoor positioning scheme (e.g., GPS, outdoor WiFi, cellular trilateration, a hybrid of GPS and cellular positioning techniques, RF fingerprinting, forward link trilateration (FLT), advanced forward link trilateration (AFLT), etc.).

Referring to FIG. 7, assume that the given UE is positioned inside of the enclosed environment and is tracking its location via the indoor positioning scheme (e.g., WiFi-based positioning scheme) and is not tracking its location via the outdoor positioning scheme (e.g., GPS), 700. As the given UE moves throughout the enclosed environment, the given UE evaluates its location to determine whether the given UE has entered into an indoor-to-outdoor transition region of the enclosed environment, 705. For example, geographical coordinates obtained via the indoor positioning scheme can be compared against the indoor-to-outdoor transition region at 705 to determine whether the UE has entered into the indoor-to-outdoor transition region. Thereby, the UE does not need to exit the given enclosed environment where the indoor positioning scheme becomes unusable before initiating the outdoor positioning scheme.

As will be appreciated, the enclosed environment can have multiple indoor-to-outdoor transition regions (e.g., see 600B through 610B of FIG. 6B or 600D through 610D of FIG. 6D), and entry into any of these indoor-to-outdoor transition regions can be checked at 705. If the given UE determines that it has not entered the indoor-to-outdoor transition region, the process returns to 700 and the given UE continues to track its location via the indoor positioning scheme (e.g., WiFi-based positioning scheme) and not the outdoor positioning scheme (e.g., GPS). Otherwise, if the given UE determines that it has entered the indoor-to-outdoor transition region, the given UE continues to track its location via the indoor positioning scheme (e.g., WiFi-based positioning scheme) and begins to track its location using the outdoor positioning scheme (e.g., GPS), 710. Thereby, the UE does not need to exit the given enclosed environment where the indoor positioning scheme becomes unusable before initiating the outdoor positioning scheme, but can instead launch the outdoor positioning scheme at 710 based upon entry into the indoor-to-outdoor transition region where the indoor positioning system is still useable. While not shown in FIG. 7, if the given UE exits the indoor-to-outdoor transition region and returns to an interior location of the enclosed environment, the process may transition from 710 back to 700.

Referring to FIG. 7, while the given UE remains in the indoor-to-outdoor transition region (or even leaves the indoor-to-outdoor transition region and moves further outside the enclosed environment), the given UE evaluates the quality of the location measurements associated with the outdoor positioning system, 715. If the quality of the location measurements associated with the outdoor positioning system is determined to not be above a first quality threshold at 715, the given UE continues to use both the indoor and outdoor positioning schemes to track its location at 710 (e.g., because the outdoor positioning scheme cannot yet be relied upon exclusively for tracking the given UE's location). In the example where the outdoor positioning system corresponds to GPS, the first quality threshold may correspond to a sufficient number of GPS satellites (e.g., 4) being in-view with pseudorange errors below a threshold. Otherwise, if the quality of the location measurements associated with the outdoor positioning system is determined to rise above the first quality threshold at 715, the given UE stops tracking its location using the indoor position scheme and transitions exclusively to the outdoor positioning scheme, 720 (e.g., because the outdoor positioning scheme can now be relied upon exclusively for tracking the given UE's location). While not shown explicitly in FIG. 7, 720 represents an alternative start point to the process of FIG. 7 if the given UE had started the process in the outdoor space instead of the indoor space relative to the enclosed environment.

Referring to FIG. 7, as the given UE moves outside of the enclosed environment, the given UE evaluates its location to determine whether the given UE has entered into an outdoor-to-indoor transition region of the enclosed environment, 725. For example, geographical coordinates obtained via the outdoor positioning scheme can be compared against the outdoor-to-indoor transition region at 725 to determine whether the UE has entered into the outdoor-to-indoor transition region.

As will be appreciated, the enclosed environment can have multiple outdoor-to-indoor transition regions (e.g., see 600C through 610C of FIG. 6C or 600D through 610D of FIG. 6D), and entry into any of these outdoor-to-indoor transition regions can be checked at 725. If the given UE determines that it has not entered the outdoor-to-indoor transition region, the process returns to 720 and the given UE continues to track its location via the outdoor positioning scheme (e.g., GPS) and not the indoor positioning scheme (e.g., WiFi-based transitioning scheme). Otherwise, if the given UE determines that it has entered outdoor-to-indoor transition region, the given UE continues to track its location via the outdoor positioning scheme (e.g., GPS) and begins to track its location using the indoor positioning scheme (e.g., WiFi-based positioning scheme), 730. Thereby, the UE does not need to enter the given enclosed environment where the outdoor positioning scheme becomes unusable before initiating the indoor positioning scheme, but can instead launch the indoor positioning scheme at 730 based upon entry into the outdoor-to-indoor transition region where the outdoor positioning system is still useable. While not shown in FIG. 7, if the given UE exits the outdoor-to-indoor transition region and returns to a location that is further away from the enclosed environment, the process may transition from 730 back to 720.

Referring to FIG. 7, while the given UE remains in the outdoor-to-indoor transition region (or even leaves the outdoor-to-indoor transition region and moves further inside of the enclosed environment), the given UE evaluates the quality of the location measurements associated with the indoor positioning system, 735. If the quality of the location measurements associated with the indoor positioning system is determined to not be above a second quality threshold at 735, the given UE continues to use both the indoor and outdoor positioning schemes to track its location at 730 (e.g., because the indoor positioning scheme cannot yet be relied upon exclusively for tracking the given UE's location). In the example where the indoor positioning system corresponds to WiFi, the second quality threshold may correspond to a sufficient number of WiFi signals and/or a sufficient signal strength of the WiFi signals. Otherwise, if the quality of the location measurements associated with the indoor positioning system is determined to rise above the second quality threshold at 735, the process of FIG. 7 returns to 700 where the given UE stops tracking its location using the outdoor position scheme and transitions exclusively to the indoor positioning scheme, 700 (e.g., because the indoor positioning scheme can now be relied upon exclusively for tracking the given UE's location).

Figure 8:
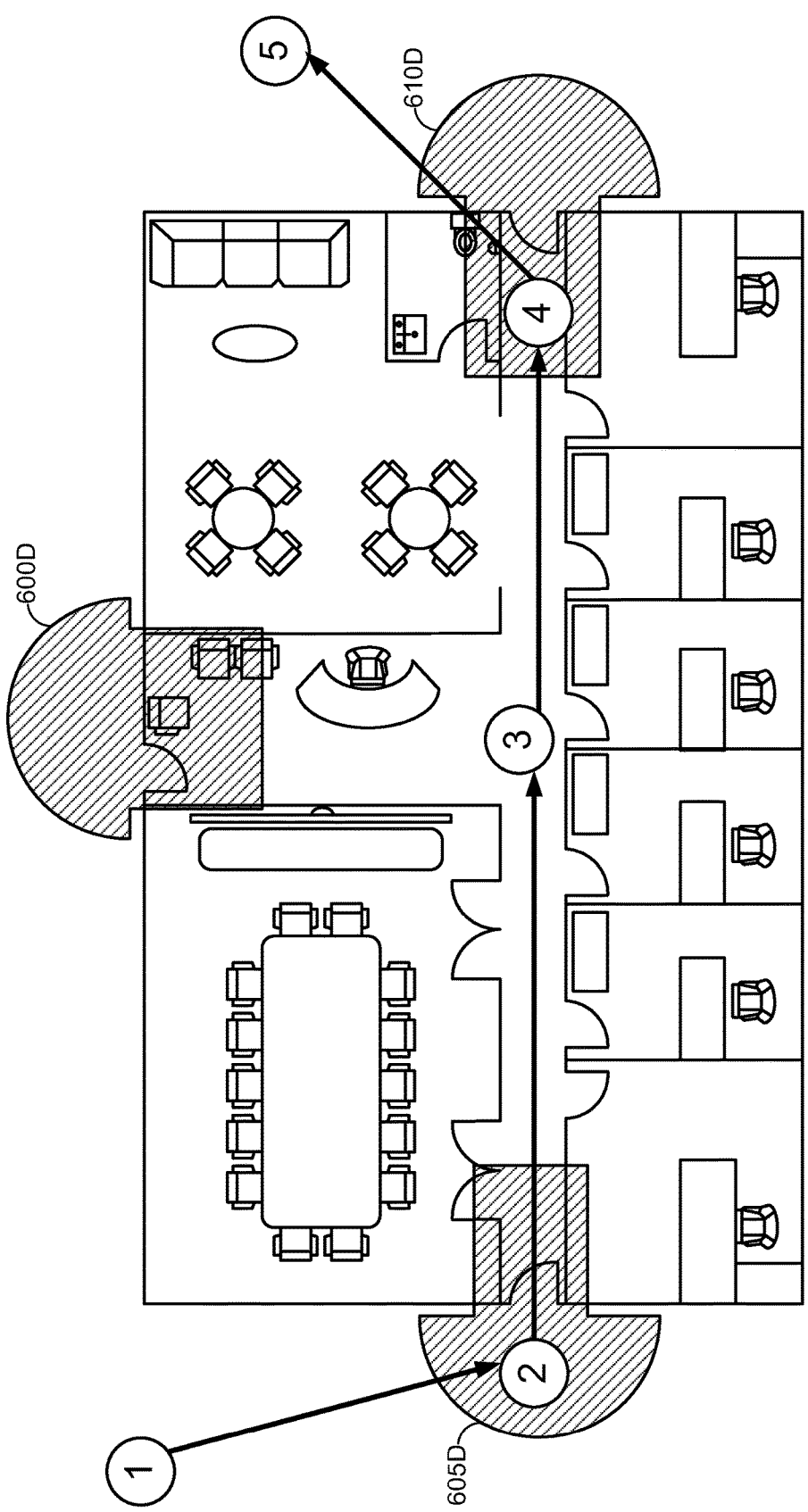
FIG. 8 illustrates an example implementation of the process of FIG. 7 with respect to the combination of the indoor-to-outdoor transition regions and the outdoor-to-indoor transition regions from FIG. 6D in accordance with an embodiment of the invention.

FIG. 8 illustrates an example implementation of the process of FIG. 7 with respect to the combined transition regions 600D through 615 (i.e., transition regions that include both indoor-to-outdoor and outdoor-to-indoor transition regions) from FIG. 6D in accordance with an embodiment of the invention. Referring to FIG. 8, the given UE begins outside of the enclosed environment (i.e., the office space or office building) at position 1, where the given UE tracks its location using the outdoor positioning scheme and not the indoor positioning scheme (720). The given UE then moves into the outdoor-to-indoor position region 605D at position 2 (725), where the given UE tracks its location using both the indoor and outdoor positioning schemes (730). The given UE then moves to an interior location of the enclosed environment at position 3 where the quality of the indoor positioning scheme rises above the second quality threshold (735), which prompts the given UE to stop tracking its location using the outdoor positioning scheme and instead to rely exclusively upon the indoor positioning scheme (700). The given UE then moves into the indoor-to-outdoor position region 610D at position 4 (705), where the given UE tracks its location using both the indoor and outdoor positioning schemes (710). The given UE then moves to an exterior location that is further away from the enclosed environment at position 5 where the quality of the outdoor positioning scheme rises above the first quality threshold (715), which prompts the given UE to stop tracking its location using the indoor positioning scheme and instead to rely exclusively upon the outdoor positioning scheme (720).

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method of operating a user equipment (UE), comprising:
    obtaining, by the UE, transition region information that characterizes a set of indoor-to-outdoor transition regions between an indoor space and an outdoor space relative to a given enclosed environment and a set of outdoor-to-indoor transition regions between the indoor space and the outdoor space relative to the given enclosed environment that is separate from the set of indoor-to-outdoor transition regions, wherein the set of indoor-to-outdoor transition regions is defined based on measurements that indicate an availability of an indoor positioning scheme based on a first wireless technology, wherein the set of indoor-to-outdoor transition regions includes a plurality of non-overlapping indoor-to-outdoor transition regions and the set of outdoor-to-indoor transition regions includes a plurality of non-overlapping outdoor-to-indoor transition regions, wherein each non-overlapping indoor-to-outdoor transition region includes and/or is in proximity to a different point of exit out of the given enclosed environment, wherein each non-overlapping outdoor-to-indoor transition region includes and/or is in proximity to a different point of entry into the given enclosed environment, and wherein at least one of the different points of exit is the same as at least one of the different points of entry;
    tracking, by the UE, a location of the UE using the indoor positioning scheme while the UE is operating within the indoor space;
    detecting, by the UE based on the location tracking using the indoor positioning scheme, that the UE has entered into a given indoor-to-outdoor transition region from the set of indoor-to-outdoor transition regions; and
    initiating, by the UE, location tracking of the UE using an outdoor positioning scheme based on a second wireless technology that is different from the first wireless technology in response to the detection.

2. The method of claim 1, wherein the UE continues the location tracking using the indoor positioning scheme after the location tracking using the outdoor positioning scheme is initiated.

3. The method of claim 2, further comprising:
    determining that a quality associated with the outdoor positioning scheme is above a quality threshold; and
    stopping the location tracking using the indoor positioning scheme while continuing the location tracking using the outdoor positioning scheme in response to the determination.

4. The method of claim 2, further comprising:
    determining, based on the location tracking using the indoor positioning scheme, the location tracking using the outdoor positioning scheme or a combination thereof, that the UE has transitioned from the given indoor-to-outdoor transition region back to the indoor space; and
    stopping the location tracking using the outdoor positioning scheme while continuing or resuming the location tracking using the indoor positioning scheme in response to the determination.

5. The method of claim 1, further comprising:
    stopping the location tracking using the indoor positioning scheme in conjunction with initiating the location tracking using the outdoor positioning scheme.

6. The method of claim 1, wherein the outdoor positioning scheme corresponds to a satellite positioning system (SPS) scheme and the indoor positioning scheme corresponds to a WiFi-based positioning scheme based on WiFi access points (APs) serving the indoor space.

7. The method of claim 1, further comprising:
    reporting location information that characterizes a current location of the UE to a server,
    wherein the obtaining obtains the transition region information from the server based on an association between the reported location information and a location of the given enclosed environment.

8. The method of claim 1, wherein the location tracking of the UE using the outdoor positioning scheme is initiated based on the UE's detected entry into the given indoor-to-outdoor transition region irrespective of a quality level associated with the indoor or outdoor positioning schemes.

9. A method of operating a user equipment (UE), comprising:
    obtaining, by the UE, transition region information that characterizes a set of outdoor-to-indoor transition regions between an indoor space and an outdoor space relative to a given enclosed environment and a set of indoor-to-outdoor transition regions between the indoor space and the outdoor space relative to the given enclosed environment that is separate from the set of outdoor-to-indoor transition regions, wherein the set of outdoor-to-indoor transition regions is defined based on measurements that indicate an availability of an indoor positioning scheme based on a first wireless technology, wherein the set of outdoor-to-indoor transition regions includes a plurality of non-overlapping outdoor-to-indoor transition regions and the set of indoor-to-outdoor transition regions includes a plurality of non-overlapping indoor-to-out-door transition regions, wherein each non-overlapping outdoor-to-indoor transition region includes and/or is in proximity to a different point of entry into the given enclosed environment, wherein each non-overlapping indoor-to-outdoor transition region includes and/or is in proximity to a different point of exit out of the given enclosed environment, and wherein at least one of the different points of exit is the same as at least one of the different points of entry;
    tracking, by the UE, a location of the UE using an outdoor positioning scheme based on a second wireless technology that is different than the first wireless technology while the UE is operating within the outdoor space;
    detecting, by the UE based on the location tracking using the outdoor positioning scheme, that the UE has entered into a given outdoor-to-indoor transition region from the set of outdoor-to-indoor transition regions; and initiating, by the UE, location tracking of the UE using the indoor positioning scheme in response to the detection.

10. The method of claim 9, wherein the UE continues the location tracking using the outdoor positioning scheme after the location tracking using the indoor positioning scheme is initiated.

11. The method of claim 10, further comprising:
determining that a quality associated with the indoor positioning scheme is above a quality threshold; and
stopping the location tracking using the outdoor positioning scheme while continuing the location tracking using the indoor positioning scheme in response to the determination.

12. The method of claim 10, further comprising:
determining, based on the location tracking using the indoor positioning scheme, the location tracking using the outdoor positioning scheme or a combination thereof, that the UE has transitioned from the given outdoor-to-indoor transition region back to the outdoor space; and
stopping the location tracking using the indoor positioning scheme while continuing or resuming the location tracking using the outdoor positioning scheme in response to the determination.

13. The method of claim 9, further comprising:
stopping the location tracking using the outdoor positioning scheme in conjunction with initiating the location tracking using the indoor positioning scheme.

14. The method of claim 9, wherein the outdoor positioning scheme corresponds to a satellite positioning system (SPS) scheme and the indoor positioning scheme corresponds to a WiFi-based positioning scheme based on WiFi access points (APs) serving the indoor space.

15. The method of claim 9, further comprising:
reporting location information that characterizes a current location of the UE to a server,
wherein the obtaining obtains the transition region information from the server based on an association between the reported location information and a location of the given enclosed environment.

16. The method of claim 9, wherein the location tracking of the UE using the indoor positioning scheme is initiated based on the UE's detected entry into the given outdoor-to-indoor transition region irrespective of a quality level associated with the indoor or outdoor positioning schemes.

17. A user equipment (UE), comprising:
means for obtaining transition region information that characterizes a set of indoor-to-outdoor transition regions between an indoor space and an outdoor space relative to a given enclosed environment and a set of outdoor-to-indoor transition regions between the indoor space and the outdoor space relative to the given enclosed environment that is separate from the set of indoor-to-outdoor transition regions, wherein the set of indoor-to-outdoor transition regions is defined based on measurements that indicate an availability of an indoor positioning scheme based on a first wireless technology, wherein the set of indoor-to-outdoor transition regions includes a plurality of non-overlapping indoor-to-outdoor transition regions and the set of outdoor-to-indoor transition regions includes a plurality of non-overlapping outdoor-to-indoor transition regions, wherein each non-overlapping indoor-to-outdoor transition region includes and/or is in proximity to a different point of exit out of the given enclosed environment, wherein each non-overlapping outdoor-to-indoor transition region includes and/or is in proximity to a different point of entry into the given enclosed environment, and wherein at least one of the different points of exit is the same as at least one of the different points of entry;
means for tracking a location of the UE using the indoor positioning scheme while the UE is operating within the indoor space;
means for detecting, based on the location tracking using the indoor positioning scheme, that the UE has entered into a given indoor-to-outdoor transition region from the set of indoor-to-outdoor transition regions; and
means for initiating location tracking of the UE using an outdoor positioning scheme based on a second wireless technology that is different from the first wireless technology in response to the detection.

18. A user equipment (UE), comprising:
means for obtaining transition region information that characterizes a set of outdoor-to-indoor transition regions between an indoor space and an outdoor space relative to a given enclosed environment and a set of indoor-to-outdoor transition regions between the indoor space and the outdoor space relative to the given enclosed environment that is separate from the set of outdoor-to-indoor transition regions, wherein the set of outdoor-to-indoor transition regions is defined based on measurements that indicate an availability of an indoor positioning scheme based on a first wireless technology, wherein the set of outdoor-to-indoor transition regions includes a plurality of non-overlapping outdoor-to-indoor transition regions and the set of indoor-to-outdoor transition regions includes a plurality of non-overlapping indoor-to-out-door transition regions, wherein each non-overlapping outdoor-to-indoor transition region includes and/or is in proximity to a different point of entry into the given enclosed environment, wherein each non-overlapping indoor-to-outdoor transition region includes and/or is in proximity to a different point of exit out of the given enclosed environment, and wherein at least one of the different points of exit is the same as at least one of the different points of entry;
means for tracking a location of the UE using an outdoor positioning scheme based on a second wireless technology that is different than the first wireless technology while the UE is operating within the outdoor space;
means for detecting, based on the location tracking using the outdoor positioning scheme, that the UE has entered into a given outdoor-to-indoor transition region from the set of outdoor-to-indoor transition regions; and
means for initiating location tracking of the UE using the indoor positioning scheme in response to the detection.

19. A user equipment (UE), comprising:
logic configured to obtain transition region information that characterizes a set of indoor-to-outdoor transition regions between an indoor space and an outdoor space relative to a given enclosed environment and a set of outdoor-to-indoor transition regions between the indoor space and the outdoor space relative to the given enclosed environment that is separate from the set of indoor-to-outdoor transition regions, wherein the set of indoor-to-outdoor transition regions is defined based on measurements that indicate an availability of an indoor positioning scheme based on a first wireless technology, wherein the set of indoor-to-outdoor transition regions includes a plurality of non-overlapping indoor-to-outdoor transition regions and the set of outdoor-to-indoor transition regions includes a plurality of non-overlapping outdoor-to-indoor transition regions, wherein each non-overlapping indoor-to-outdoor transition region includes and/or is in proximity to a different point of exit out of the given enclosed environment, wherein each non-overlapping outdoor-to-indoor transition region includes and/or is in proximity to a different point of entry into the given enclosed environment, and wherein at least one of the different points of exit is the same as at least one of the different points of entry;

logic configured to track a location of the UE using the indoor positioning scheme while the UE is operating within the indoor space;

logic configured to detect, based on the location tracking using the indoor positioning scheme, that the UE has entered into a given indoor-to-outdoor transition region from the set of indoor-to-outdoor transition regions; and logic configured to initiate location tracking of the UE using an outdoor positioning scheme based on a second wireless technology that is different from the first wireless technology in response to the detection.

20. A user equipment (UE), comprising:

logic configured to obtain transition region information that characterizes a set of outdoor-to-indoor transition regions between an indoor space and an outdoor space relative to a given enclosed environment and a set of indoor-to-outdoor transition regions between the indoor space and the outdoor space relative to the given enclosed environment that is separate from the set of outdoor-to-indoor transition regions, wherein the set of outdoor-to-indoor transition regions is defined based on measurements that indicate an availability of an indoor positioning scheme based on a first wireless technology, wherein the set of outdoor-to-indoor transition regions includes a plurality of non-overlapping outdoor-to-indoor transition regions and the set of indoor-to-outdoor transition regions includes a plurality of non-overlapping indoor-to-out-door transition regions, wherein each non-overlapping outdoor-to-indoor transition region includes and/or is in proximity to a different point of entry into the given enclosed environment, wherein each non-overlapping indoor-to-outdoor transition region includes and/or is in proximity to a different point of exit out of the given enclosed environment, and wherein at least one of the different points of exit is the same as at least one of the different points of entry;

logic configured to track a location of the UE using an outdoor positioning scheme based on a second wireless technology that is different than the first wireless technology while the UE is operating within the outdoor space;

logic configured to detect, based on the location tracking using the outdoor positioning scheme, that the UE has entered into a given outdoor-to-indoor transition region from the set of outdoor-to-indoor transition regions; and logic configured to initiate location tracking of the UE using the indoor positioning scheme in response to the detection.

21. A non-transitory computer-readable medium containing instructions stored thereon, which, when executed by a user equipment (UE), cause the UE to perform operations, the instructions comprising:

at least one instruction to cause the UE to obtain transition region information that characterizes a set of indoor-to-outdoor transition regions between an indoor space and an outdoor space relative to a given enclosed environment and a set of outdoor-to-indoor transition regions between the indoor space and the outdoor space relative to the given enclosed environment that is separate from the set of indoor-to-outdoor transition regions, wherein the set of indoor-to-outdoor transition regions is defined based on measurements that indicate an availability of an indoor positioning scheme based on a first wireless technology, wherein the set of indoor-to-outdoor transition regions includes a plurality of non-overlapping indoor-to-outdoor transition regions and the set of outdoor-to-indoor transition regions includes a plurality of non-overlapping outdoor-to-indoor transition regions, wherein each non-overlapping indoor-to-outdoor transition region includes and/or is in proximity to a different point of exit out of the given enclosed environment, wherein each non-overlapping outdoor-to-indoor transition region includes and/or is in proximity to a different point of entry into the given enclosed environment, and wherein at least one of the different points of exit is the same as at least one of the different points of entry;

at least one instruction to cause the UE to track a location of the UE using the indoor positioning scheme while the UE is operating within the indoor space;

at least one instruction to cause the UE to detect, based on the location tracking using the indoor positioning scheme, that the UE has entered into a given indoor-to-outdoor transition region from the set of indoor-to-outdoor transition regions; and at least one instruction to cause the UE to initiate location tracking of the UE using an outdoor positioning scheme based on a second wireless technology that is different from the first wireless technology in response to the detection.

22. A non-transitory computer-readable medium containing instructions stored thereon, which, when executed by a user equipment (UE), cause the UE to perform operations, the instructions comprising:

at least one instruction to cause the UE to obtain transition region information that characterizes a set of outdoor-to-indoor transition regions between an indoor space and an outdoor space relative to a given enclosed environment and a set of indoor-to-outdoor transition regions between the indoor space and the outdoor space relative to the given enclosed environment that is separate from the set of outdoor-to-indoor transition regions, wherein the set of outdoor-to-indoor transition regions is defined based on measurements that indicate an availability of an indoor positioning scheme based on a first wireless technology, wherein the set of outdoor-to-indoor transition regions includes a plurality of non-overlapping outdoor-to-indoor transition regions and the set of indoor-to-outdoor transition regions includes a plurality of non-overlapping indoor-to-out-door transition regions, wherein each non-overlapping outdoor-to-indoor transition region includes and/or is in proximity to a different point of entry into the given enclosed environment, and wherein each non-overlapping indoor-to-outdoor transition region includes and/or is in proximity to a different point of exit out of the given enclosed environment;

at least one instruction to cause the UE to track a location of the UE using an outdoor positioning scheme based on a second wireless technology that is different than the first wireless technology while the UE is operating within the outdoor space;

at least one instruction to cause the UE to detect, based on the location tracking using the outdoor positioning scheme, that the UE has entered into a given outdoor-to-indoor transition region from the set of outdoor-to-indoor transition regions; and at least one instruction to cause the UE to initiate location tracking of the UE using the indoor positioning scheme in response to the detection.

23. The UE of claim 19, wherein the logic configured to track the location of the UE continues the location tracking using the indoor positioning scheme, after the logic configured to initiate initiates the location tracking of the UE using the outdoor positioning scheme.

24. The UE of claim 19, wherein the logic configured to track the location of the UE stops the location tracking using the indoor positioning scheme after the logic configured to initiate initiates the location tracking using the outdoor positioning scheme.

25. The UE of claim 20, wherein the logic configured to track the location of the UE continues the location tracking using the outdoor positioning scheme, after the logic configured to initiate initiates the location tracking of the UE using the indoor positioning scheme.

26. The UE of claim 20, wherein the logic configured to track the location of the UE stops the location tracking using the outdoor positioning scheme after the logic configured to initiate initiates the location tracking using the indoor positioning scheme.

* * * * *